United States Patent
Lau

(10) Patent No.: US 8,200,842 B1
(45) Date of Patent: Jun. 12, 2012

(54) AUTOMATIC TRAFFIC CONTROL USING DYNAMIC DNS UPDATE

(75) Inventor: Priscilla Lau, Fremont, CA (US)

(73) Assignee: Cellco Partnership, Basking Ridge, NJ (US)

( * ) Notice: Subject to any disclaimer, the term of this patent is extended or adjusted under 35 U.S.C. 154(b) by 305 days.

(21) Appl. No.: 11/585,775

(22) Filed: Oct. 25, 2006

(51) Int. Cl.
*G06F 15/16* (2006.01)

(52) U.S. Cl. ........................................ 709/245
(58) Field of Classification Search .................. 709/245
See application file for complete search history.

(56) References Cited

U.S. PATENT DOCUMENTS

| | | | |
|---|---|---|---|
| 6,104,711 A | 8/2000 | Voit | |
| 6,754,699 B2 | 6/2004 | Swildens et al. | |
| 6,754,706 B1 | 6/2004 | Swildens et al. | |
| 2006/0190603 A1* | 8/2006 | Anzai et al. | 709/226 |
| 2007/0203890 A1* | 8/2007 | Sareen et al. | 707/3 |

OTHER PUBLICATIONS

DNS Zone Transfer, Wikipedia, Mar. 9, 2005. Retrieved from <http://web.archive.org/web/20050309181022/http://en.wikipedia.org/wiki/DNS_zone_transfer> on Nov. 13, 2008.*

Microsoft KB Article 816592, "How to Configure DNS Dynamic Update in Windows 2003", Jul. 15, 2004, retrieved from <http://web.archive.org/web/20041020214304/http://support.microsoft.com/kb/816592> on Nov. 13, 2008.*

Jong-Bae Moon, Myung-Ho Kim, "Dynamic Load Balancing Method Based on DNS for Distributed Web Systems", Springer-Verlag Berlin Heidelberg, 2005. p. 1-10.*

S. Thomson, Y. Rekhter, J. Bound, RFC 2136: DNS UPDATE, Apr. 1997. p. 1-33.*

Wikipedia, Domain Name System, Dec. 2005. Retrieved from <http://web.archive.org/web/20051225060436/http://en.wikipedia.org/wiki/Domain_Name_System> on Jun. 2, 2009. p. 1-16.*

P. Vixie, "A Mechanism for Prompt Notification of Zone Changes (DNS NOTIFY", RFC 1996, Aug. 1996, p. 1-15.*

* cited by examiner

*Primary Examiner* — Ryan Jakovac

(57) ABSTRACT

Method and system for a domain name translation service. A plurality of application servers associated with at least one domain name corresponding to at least one Internet Protocol (IP) address are provided. A domain name system (DNS) server hierarchy is configured for providing, based on DNS translation information associated with the requested domain name stored therein, an IP address or a list of IP addresses of the associated application server(s) as a response to a DNS query for a domain name. In addition, a dynamic traffic controller is configured for monitoring the operational status of the application servers and requesting a DNS update to the DNS translation information stored in the DNS server hierarchy based on the operational status of the application servers.

6 Claims, 15 Drawing Sheets

AUTOMATIC TRAFFIC CONTROL USING DYNAMIC DNS UPDATE

BACKGROUND

1. Technical Field

The teachings presented herein relate to methods and systems for a domain name translation service with dynamic traffic control.

2. Discussion of Related Art

There are various conventional domain name system (DNS) implementations. In those implementations, a DNS server resolves a DNS query by returning one or more IP addresses corresponding to a domain name whether or not the underlying application server associated with the domain name is actually available. This is shown in FIG. 1(a). There are a plurality of application servers 2, . . . , 4. Each application server offers the same service represented by an URL (Uniform Resource Locator) link or a domain name. Although an URL usually includes two parts: domain name and communication protocol, for simplicity, the term "URL" refers to either the domain name or the entire URL in this document to cover different implementation options, with the understanding that a DNS server translates domain name into IP address(es). Each application server also has an associated IP address. For example, the application server 1 may offer service represented by a link $URL_1$ and may have an underlying IP address IP $Addr_1$. In operation, a user 10, which may be a user's application program installed in a human-user facing terminal or device, inputs an URL representing a service provided by an application server to a DNS client 8. The DNS client 8 formulates a DNS query based on the provided URL and sends the DNS query to a DNS server 6. The DNS server 6 then resolves the DNS query by returning an IP address of an application server that provides the application/service represented by the URL to the DNS client 8. The returned IP address is obtained based on the translation information, commonly known as zone data, stored in the DNS server 6. Upon receiving the returned IP address, the DNS client 8 provides the IP address to the user 10; and the user 10 connects to an application server by using the returned IP address to request the desired service or application.

During such operation, the DNS server 6 does not monitor the condition of any of the application servers 2 . . . 4. If an application server, say application server 1, malfunctions or is unavailable, since the DNS server 6 is not aware that application server 1 is not accessible, it still returns the IP address of the application server 1 to the DNS client 8. As a result, when the user 10 contacts the application server 1 for the desired service, the user 10 may not be able to receive service in a timely manner.

FIGS. 1(b)-1(d) show some commonly deployed DNS schemes designed to address such problems. In FIG. 1(b), two different URLs, say $URL_1$ and $URL_2$, may be designated separately for the primary server and back-up server for the same service. In other words, application server 14 represents the primary server and application server 16 represents the backup server, and both servers are deployed together as application server 12 to provide a particular service. Each application server has its own distinct IP address, say IP $Addr_1$ and IP $Addr_2$, respectively. In operation, when a user 10 inputs a request for $URL_1$ for the primary server and $URL_2$ for the backup server to a DNS client 20, the DNS client 20 obtains IP $Addr_1$ and IP $Addr_2$ for URL1 and URL2, respectively, from a DNS server 18 for the user 10. The user 10 may request the desired service from the primary server first by using IP $Addr_1$. If it fails to receive desired service from the primary server, the user 10 may then request the service from the backup server by using IP $Addr_2$. With this scheme, the backup server 16 may remain idle as long as server 14 is available. A DNS client 20 may request IP addresses for both domain names in a single DNS query or it may send two separate DNS queries, one for each domain name. In either scenario, such a scheme may be time consuming.

FIG. 1(c) shows a different DNS scheme, in which a plurality of application servers 22-1, 22-2, . . . p 22-3 with different IP addresses (IP $Addr_1$, IP $Addr_2$, . . . , IP $Addr_k$) support a particular service associated with an URL. When a user 30 inputs the URL to a DNS client 28, the DNS client 28 formulates a DNS query based on the URL and sends it to a DNS server 24. The translation data, known as zone data, for that domain name is stored in a data file, known as a zone file, in the DNS server 24. A zone file contains a plurality of resource record (RR) entries 26, each containing the corresponding IP addresses for one of the application servers 22-1, 22-2, . . . , 22-3. This type of resource record is commonly known as the A (Address) record. The DNS server 24 then returns, to the DNS client 28, a list containing all IP addresses, IP $Addr_1$, IP $Addr_2$, . . . , IP $Addr_k$, in response to the DNS query. DNS sever 24 may reorder the IP addresses in the list in a round robin manner so that the first IP address is different for each DNS query to ensure equal chance for each application server to offer service to users. Upon receiving the list of IP addresses, the DNS client 28 provides the list of addresses to the user 30. The user 30 may request a desired service by using the IP addresses in the list, one at a time, according to the order in the list, until it successfully receives the service. For example, if the user 30 first uses IP $Addr_2$ to access application server 2 and fails to receive service, the user 30 may then use the next IP address in the list to access a different application server. This process continues until the desired service can be obtained.

FIG. 1(d) illustrates another DNS scheme 100 with load balancer balancers. A DNS server 115 is responsible to resolve DNS queries corresponding to a plurality of applications/services 130, . . . 140, with help from other domain name servers (or load balancer balancers in this example). Each URL may correspond to multiple application servers that provide the same service. For example, application servers 130-1, . . . , 130-2 correspond to first service 130, and application servers 140-1, . . . , 140-2 correspond to the $k^{th}$ service 140. For each service, there is a load balancer 120. For example, service 130 has a load balancer 120-1, and service 140 has a load balancer 120-k. Each load balancer is responsible for balancing the traffic to its associated application servers, and it may monitor each application server and direct traffic based on their load or health conditions.

In operation, a user 105 inputs an URL to a DNS client 110, which subsequently sends a corresponding DNS query to a DNS server 115. Depending on the requested domain name, the DNS server 115 re-directs the DNS query to a load balancer 120 associated with service 130 or service 140, according to the resource records (RR) stored on the DNS server 115. This type of resource record is commonly known as the NS (name server) record. The load balancer 120 then determines which application server should receive the traffic and returns the appropriate IP address to the DNS server 115. In this scheme, the DNS server re-directs the DNS query to another server for domain name resolution and then passes the returned result from the other server to the DNS client. Although a load balancer can usually avoid directing traffic to an unavailable or malfunctioning application server, this scheme requires an additional layer of DNS query. As a result, it introduces increased delay in DNS query processing with an additional point of failure to the network.

Hence, a need still exists for a DNS query scheme that can efficiently direct traffic to appropriate application servers.

BRIEF DESCRIPTION OF THE DRAWINGS

The present teachings are further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

Figure 1:
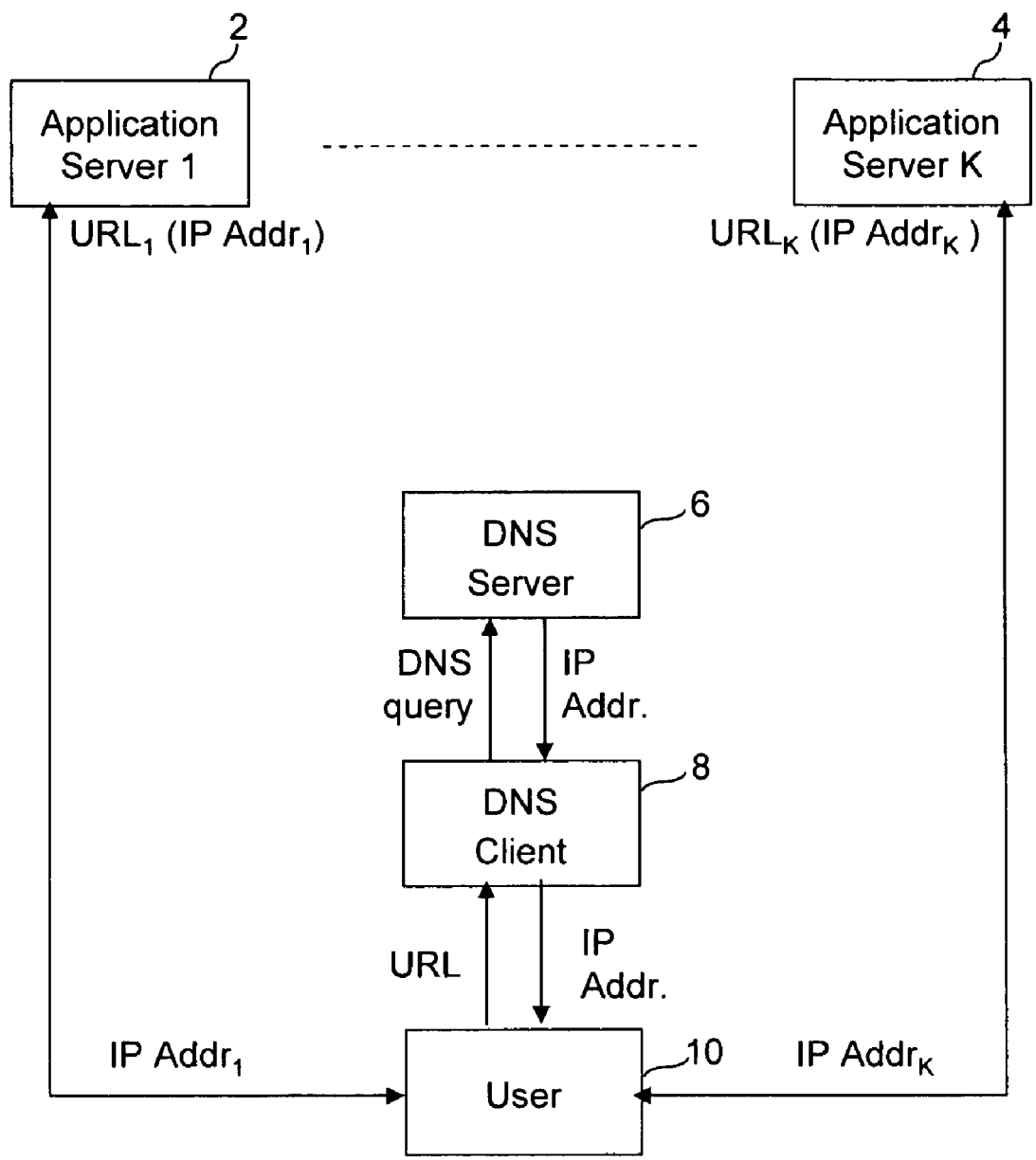
FIGS. 1(a)-1(d) depict conventional network architectures for a domain name system (DNS)
Figure 1:
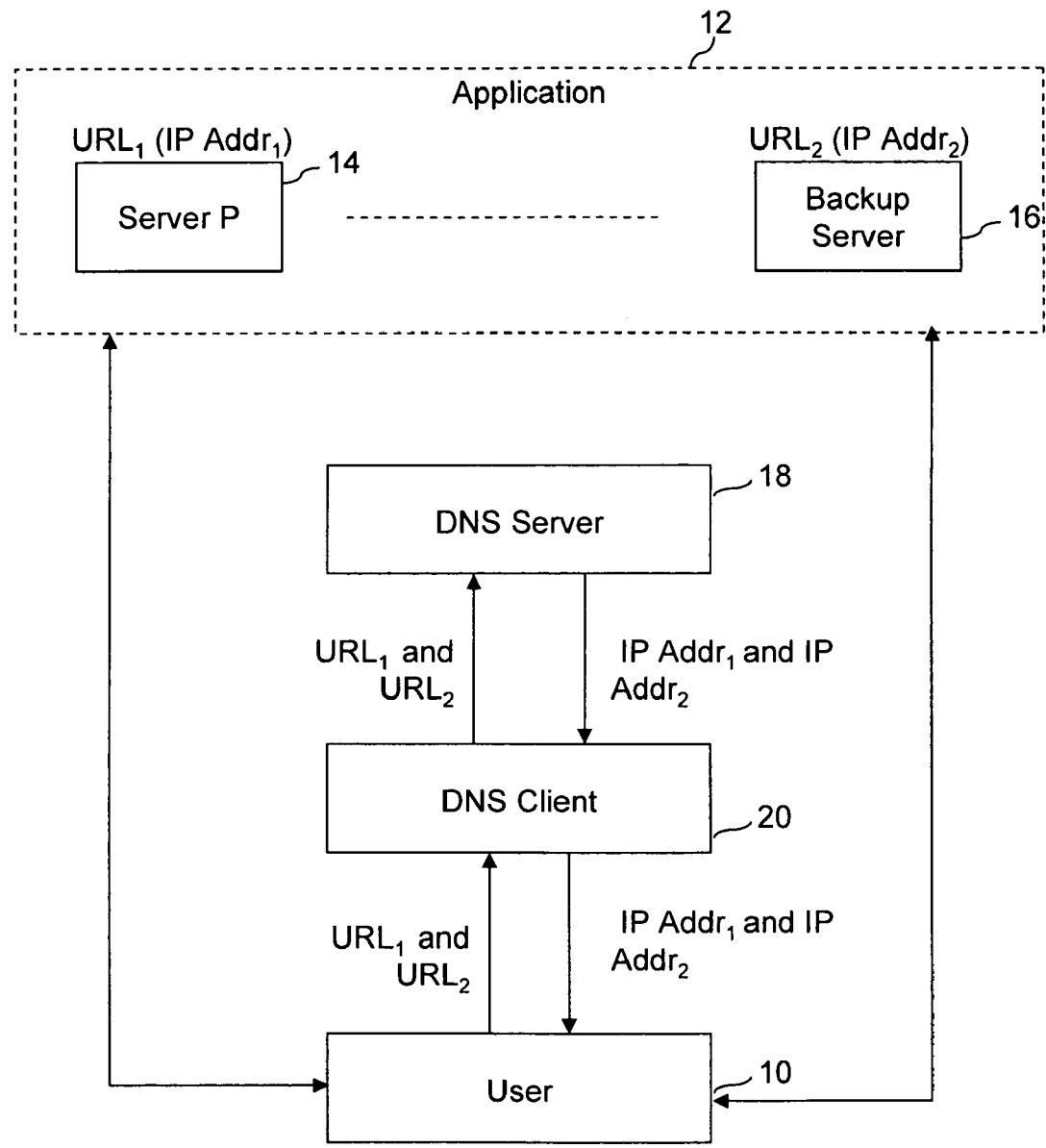
Figure 1:
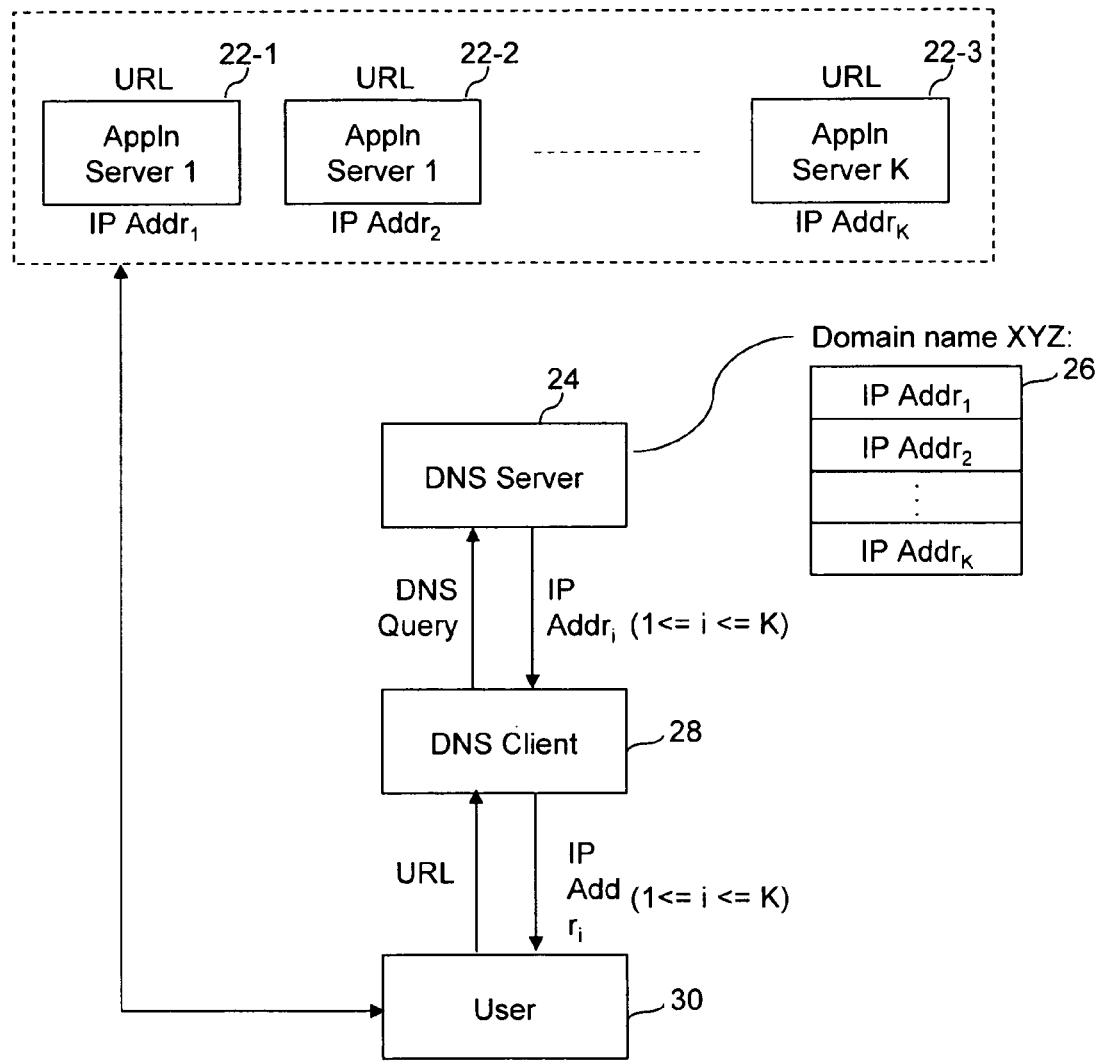
Figure 1:
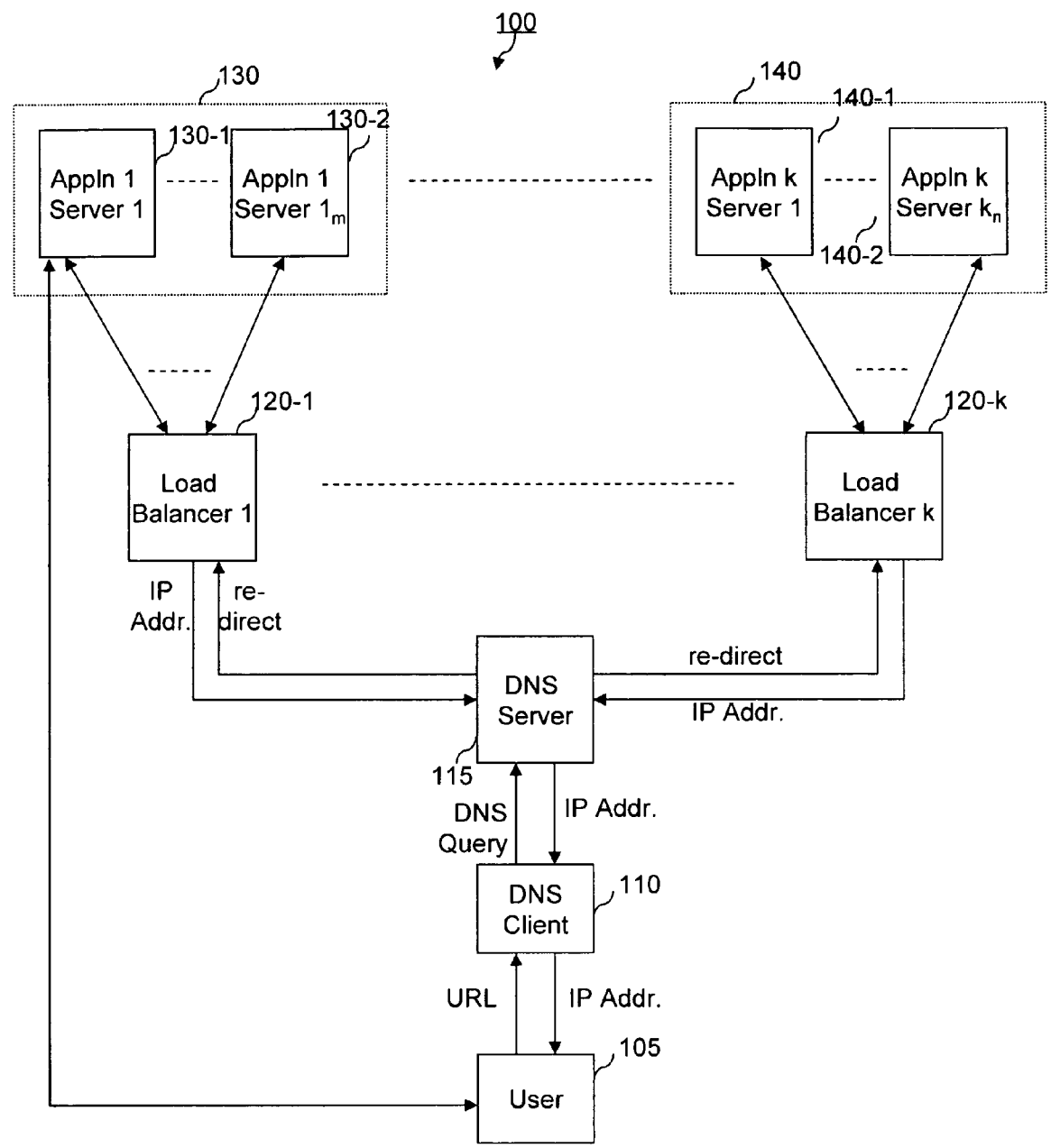
Figure 2:
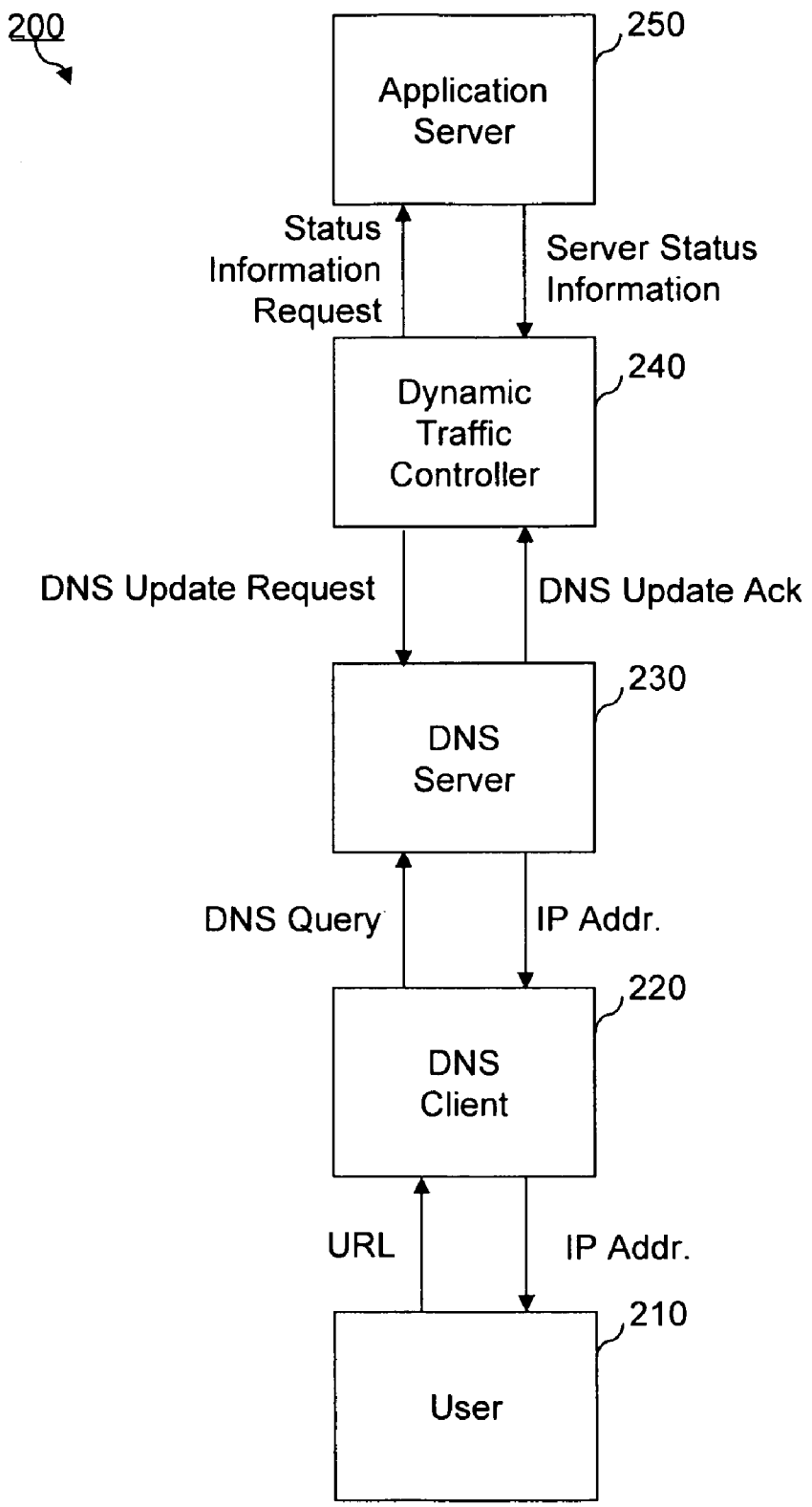
FIG. 2 depicts a network architecture for a domain name system, according to an embodiment of the present teaching.

The present teaching relates to a dynamic traffic controller and utilization thereof in a domain name system (DNS). FIG. 2 depicts a network architecture 200 for a domain name translation service, according to an embodiment of the present teaching. A user 210 inputs an URL corresponding to a service provided by an application server 250 to a DNS client 220, which subsequently issues a DNS query to a DNS server 230. The DNS server 230 translates the requested domain name into an IP address and returns the IP address to the DNS client 220 in response to the DNS query. The DNS client 220 provides the received IP address to the user 210 so that the user 210 can use the received IP address(es) to communicate with application server(s) 250.

The network architecture 200 further comprises a dynamic traffic controller 240 that dynamically determines, based on the operational status of the application server, when the IP address of an application server 250 is to be returned by DNS server 230 to DNS client 220. That is, depending on the health/load condition of an application server 250, the dynamic traffic controller 240 determines whether DNS server 230 should direct user 210 to the application server 250.

In some embodiments, the dynamic traffic controller 240 may periodically send a status information request to an application server 250, and the application server 250 may respond by sending back its operational status information. Operational status information may include simple system up or down status or more detailed information; such as system load level (e.g., 60% loaded), CPU (Central Processor Unit) utilization, throughput measurements, or subsystem response times within the application server, etc. Communication between the dynamic traffic controller 240 and an application server 250 may be conducted via any appropriate communication protocols; for example, Simple Network Management Protocol (SNMP) may be adopted to support such communication.

In some embodiments, an application server 250 may be configured to send its operational status information automatically to the dynamic traffic controller 240, on a regular basis or only when a certain condition has been met. For example, an application server 250 may initiate such communication on its own, without being requested to do so. In other embodiments, the application server 250 and the dynamic traffic controller 240 may communicate via a third party (not shown in FIG. 2). For example, the third party may collect information regarding the operational status of the application server 250 and, upon a request from the dynamic traffic controller 240, provide such information to the dynamic traffic controller 240.

Upon receiving the operational status information from an application server 250, the dynamic traffic controller 240 analyzes the information to determine the health/load condition of the application server 250. Such determination may be made based on a variety of considerations, including but not limited to the type of service offered by the application server. For example, degradation in the throughput of an application server that offers real-time video steaming service may lead to a conclusion that the application server is in poor health and/or overloaded. On the other hand, if the application server provides text service, e.g., email service, the same degree of degradation in throughput may not lead to the same conclusion.

Depending on the assessment of the condition of an application server 250, the dynamic traffic controller 240 may control DNS server differently. For instance, if an application server 250 is determined to be in poor health and/or overloaded condition and DNS server 230 is still directing traffic to it by returning its IP address to DNS client 220, the dynamic traffic controller 240 may then update DNS server 230 to temporarily prevent any traffic from being directed to that application server 250. On the other hand, if an application server 250 is determined to be in good health with light traffic condition and DNS server 230 has previously been prevented from directing traffic to it, the dynamic traffic controller 240 may then operate to enable DNS server to resume directing traffic to that application server 250. In some embodiments, the dynamic traffic controller 240 achieves such controls by requesting DNS server 230 to remove or add, respectively, a resource record (RR) entry containing the IP address of the corresponding application server from and to the translation information stored in the DNS server.

As depicted in the network hierarchy 200 in FIG. 2, the dynamic traffic controller 240 sends a DNS update request to DNS server 230 to update the DNA information such as zone data that the DNS server 230 uses to resolve a DNS query. Such DNS information may include a list of resource records (RRs), which may be in different types or in any combination thereof. For example, a resource record may correspond to a record containing an IP address that can be used to contact an application server 250 or an NS record pointing to a different server that can resolve the DNS query to the IP address of an application server 250. The DNS update request may be sent with specific instructions as to which RR is to be updated and the particular update to be performed (e.g., removal or adding). Since DNS server 230 resolves a DNS query using the zone data, when an RR entry is removed from the zone file for a domain name, the DNS server 230 is prevented from directing traffic to the IP address associated with the removed entry. Similarly, when an RR entry is added to the zone data, the DNS server 230 is configured to direct traffic to the IP address associated with the added RR entry when it receives a DNS query for the corresponding domain name.

The dynamic traffic controller 240 may be configured to operate with various conditions and support different control schemes. For example, in some embodiments, the dynamic traffic controller 240 may request the DNS server 230 to update information stored therein simply based on whether the application server 250 is up or down. That is, when the operational status information indicates that the application server 250 is down or when the dynamic traffic controller 240 fails to receive any status information from the application server 250, the dynamic traffic controller 240 may send a DNS update request to DNS server 230 to remove the RR entry corresponding to that application server 250. The dynamic traffic controller 240 may not instruct DNS server 230 to add this RR entry back until it is observed that the application server 250 is up and running again.

In some embodiments, the dynamic traffic controller 240 may operate based on load of the application server 250. For instance, when the operational status information of an application server 250 indicates that the CPU utilization thereof has reached a first threshold (e.g., 75%) or higher, the dynamic traffic controller 240 may decide that the application server 250 is approaching an overloaded condition and therefore send a DNS update request to the DNS server 230 to remove the corresponding RR entry. In the meantime, the dynamic traffic controller 240 may continue monitoring the application server 250 and may not instruct the DNS server 230 to add this RR entry back to the zone data until its CPU utilization has reached below a second threshold (e.g., 50%). The dynamic traffic controller 240 may utilize all or partial status information of an application server 250, any combination thereof, or in combination with information or knowledge from other sources in determining when to temporarily prevent or resume traffic to the application server 250. In some embodiments, the dynamic traffic controller 240 may consider not only the status information of an individual application server 250 but also the status information of other application servers that offer the same service in making a decision.

Figure 3:
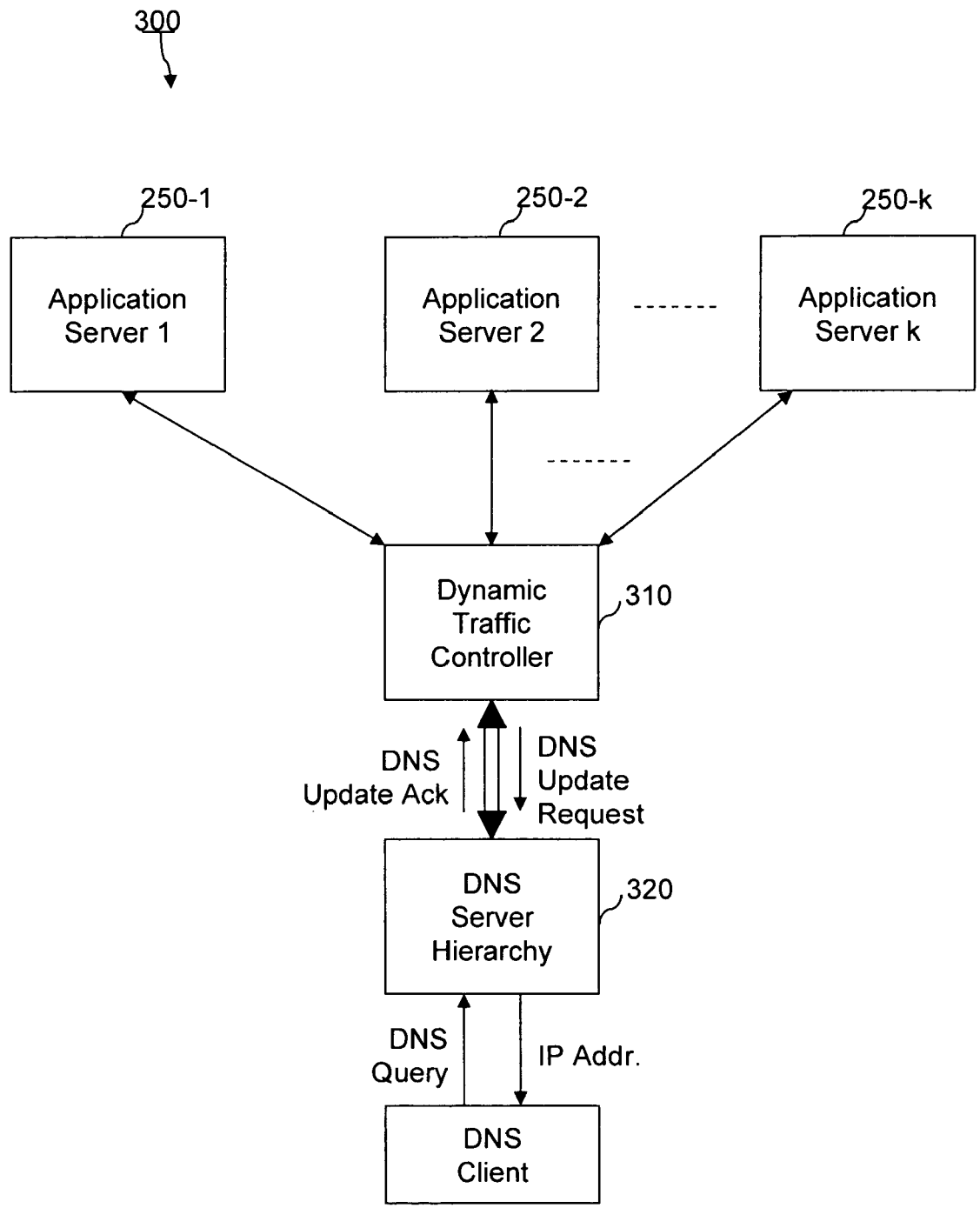
FIG. 3 depicts an alternative network architecture for a domain name system, according to an embodiment of the present teaching.

FIG. 3 depicts an alternative network architecture 300 for a domain name translation service, according to an embodiment of the present teaching. The network architecture 300 comprises a plurality of application servers 250-1, 250-2, . . . , 250-k, a dynamic traffic controller 310, a DNS server hierarchy 320, and a DNS client 330. The application servers 250-1, 250-2, . . . , 250-k may be deployed for one or more applications or services. The translation between the IP addresses of the application servers and their associated domain names is recorded as the DNS information and stored in the DNS hierarchy 320. The DNS hierarchy 320 comprises a plurality of DNS servers, which form a hierarchy with, for example, some DNS servers at a higher level of domain name resolution than others. There may be one DNS server on top of the DNS hierarchy 320 that is designated to communicate with the dynamic traffic controller 310. The dynamic traffic controller 310 resides between the plurality of application servers 250-1, 250-2, . . . , 250-k and the DNS server hierarchy 320 and operates to ensure that traffic is directed only to those application servers that satisfy certain conditions.

In operation, the dynamic traffic controller 310 may monitor the health/load of the plurality of application servers by gathering operational status information from these application servers. The operational status information may be requested periodically by the dynamic traffic controller 310 or reported automatically by the application servers without being requested. The dynamic traffic controller 310 communicates with the applications servers to monitor the status of each of the application servers. In some embodiments, the communication between the dynamic traffic controller 310 and an application server is conducted in accordance with appropriate protocol. For example, Simple Network management Protocol (SNMP) or any other suitable protocol may be used for such communication. The application servers may also submit on their own initiation operational status information without being requested.

By analyzing the operational status information of the application servers, the dynamic traffic controller 310 may dynamically determine when to temporarily prevent traffic from being directed to an application server and when to resume directing traffic to an application server. The dynamic traffic controller 310 achieves such control by communicating with the DNS server hierarchy 320 and sending a DNS update request to the DNS server hierarchy 320 for either removing or adding the appropriate RR entry (or entries) to the zone data stored in the DNS server hierarchy 320. Such communication between the dynamic traffic controller 310 and the DNS server hierarchy 320 may be conducted in accordance with appropriate protocol such as the Request For Comments (RFC) protocol(s) defined by Internet Engineering Task Force (IETF). For instance, RFC 2136 may be implemented in the DNS server hierarchy so that the dynamic traffic controller 310 needs to submit only changes to a single DNS server, e.g., a primary master DNS server, within the DNS server hierarchy, and such changes can then be propagated to all DNS servers in the DNS server hierarchy that have a copy of the impacted zone data.

Figure 4:
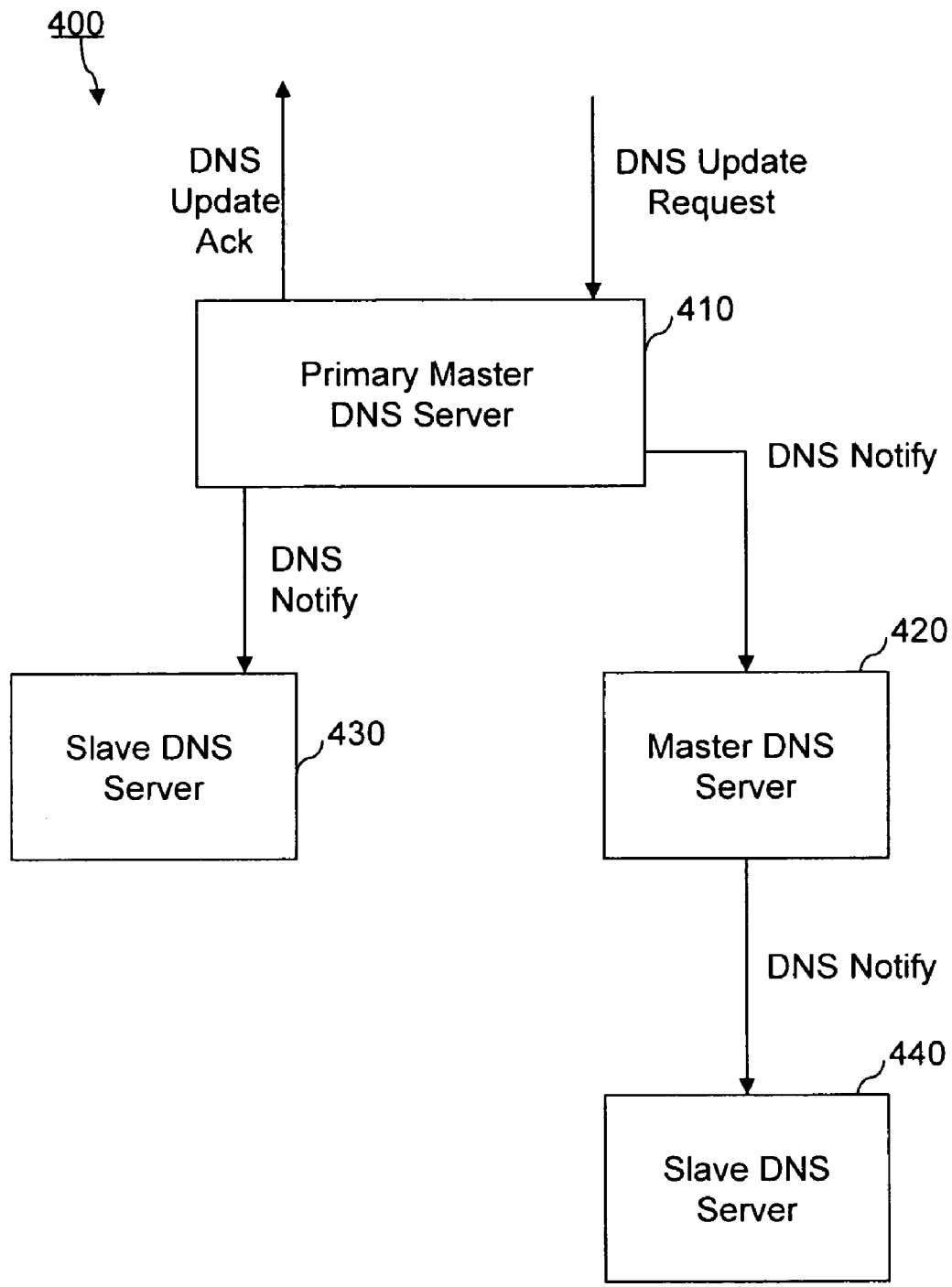
FIGS. 4(a)-4(c) show various exemplary schemes of updating DNS information within a DNS hierarchy, according to different embodiments of the present teaching.
FIGS. 4(d)-4(e) show different exemplary schemes of resolving a DNS query within a DNS hierarchy.
Figure 4:
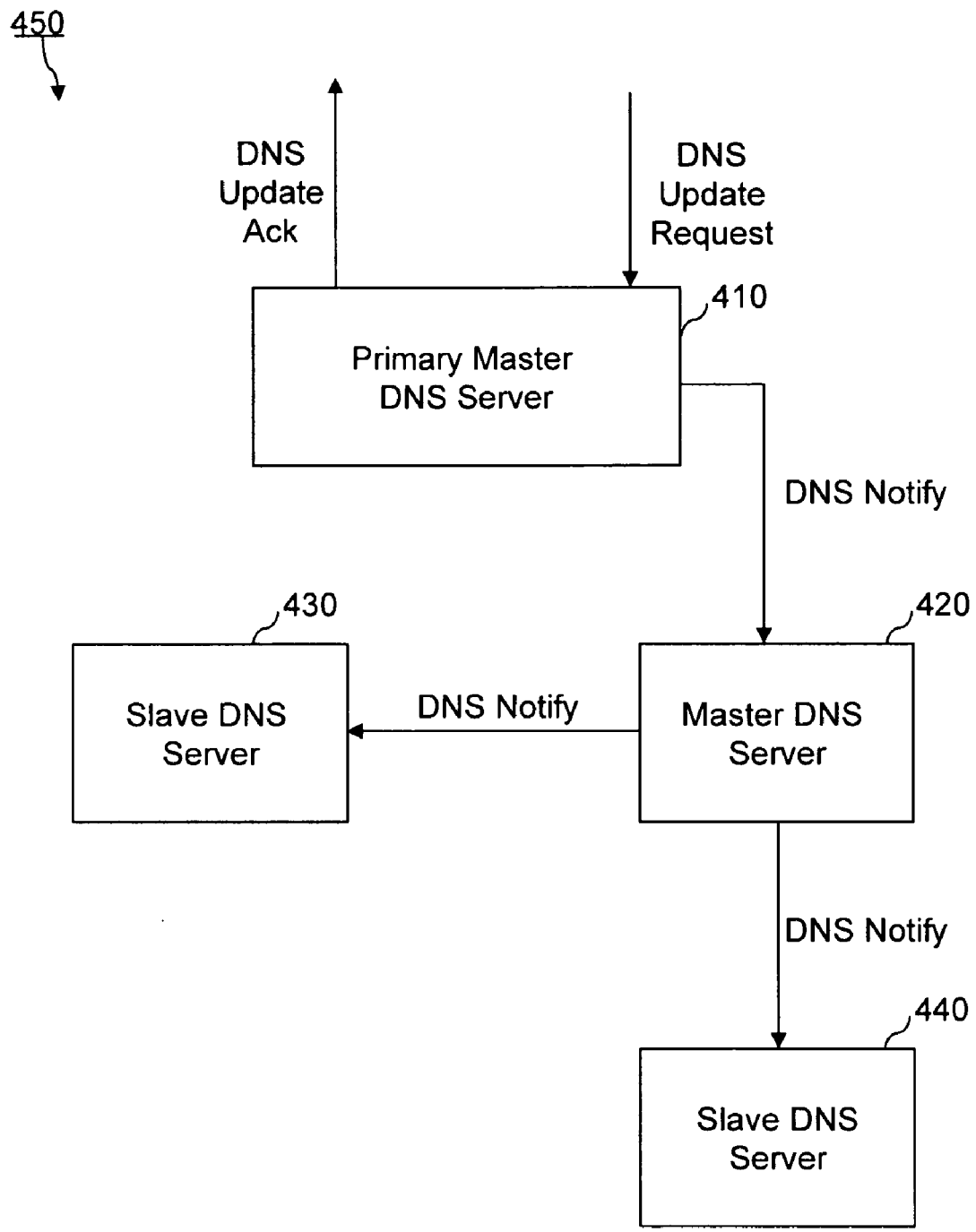
Figure 4:
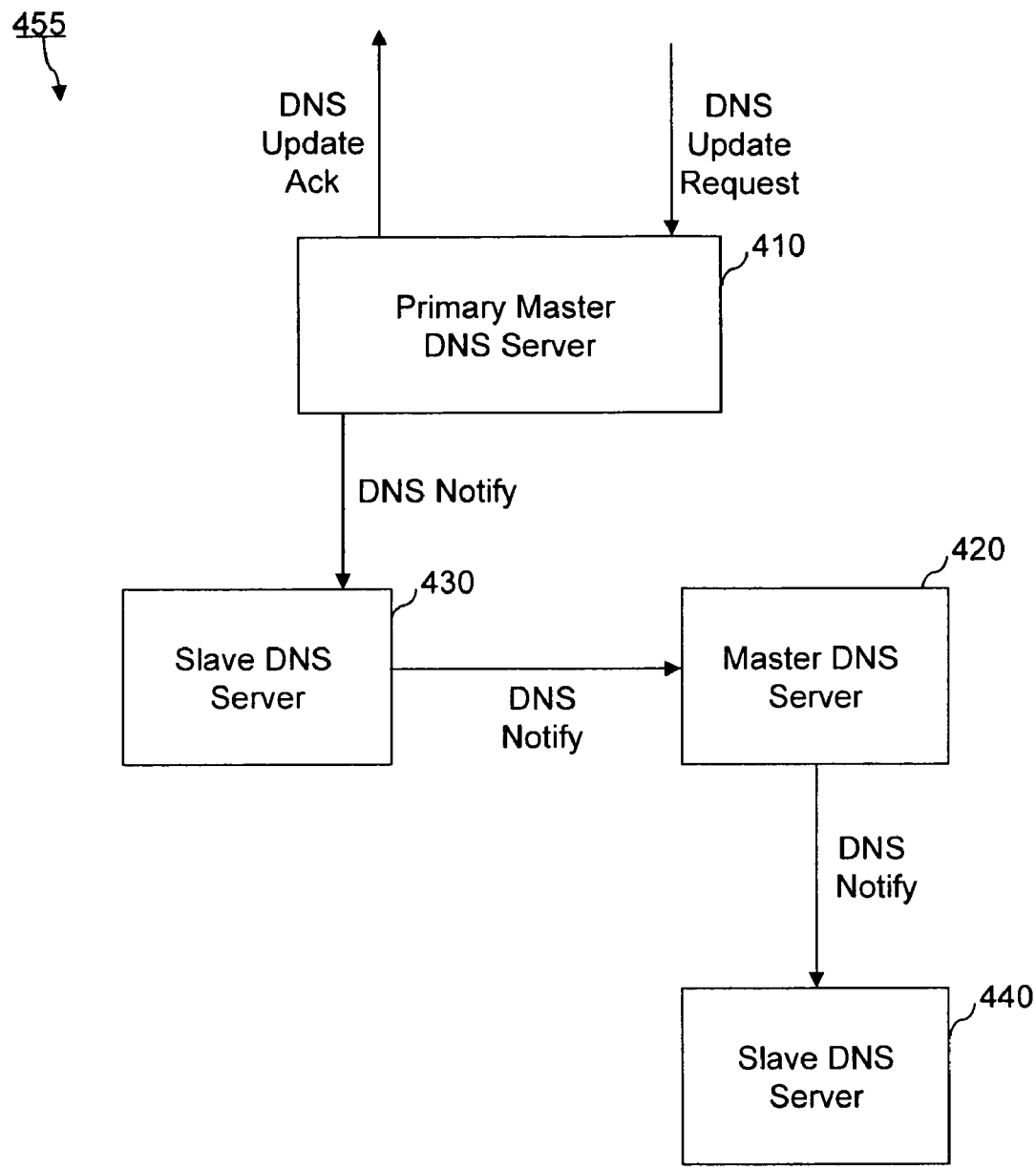
Figure 4:
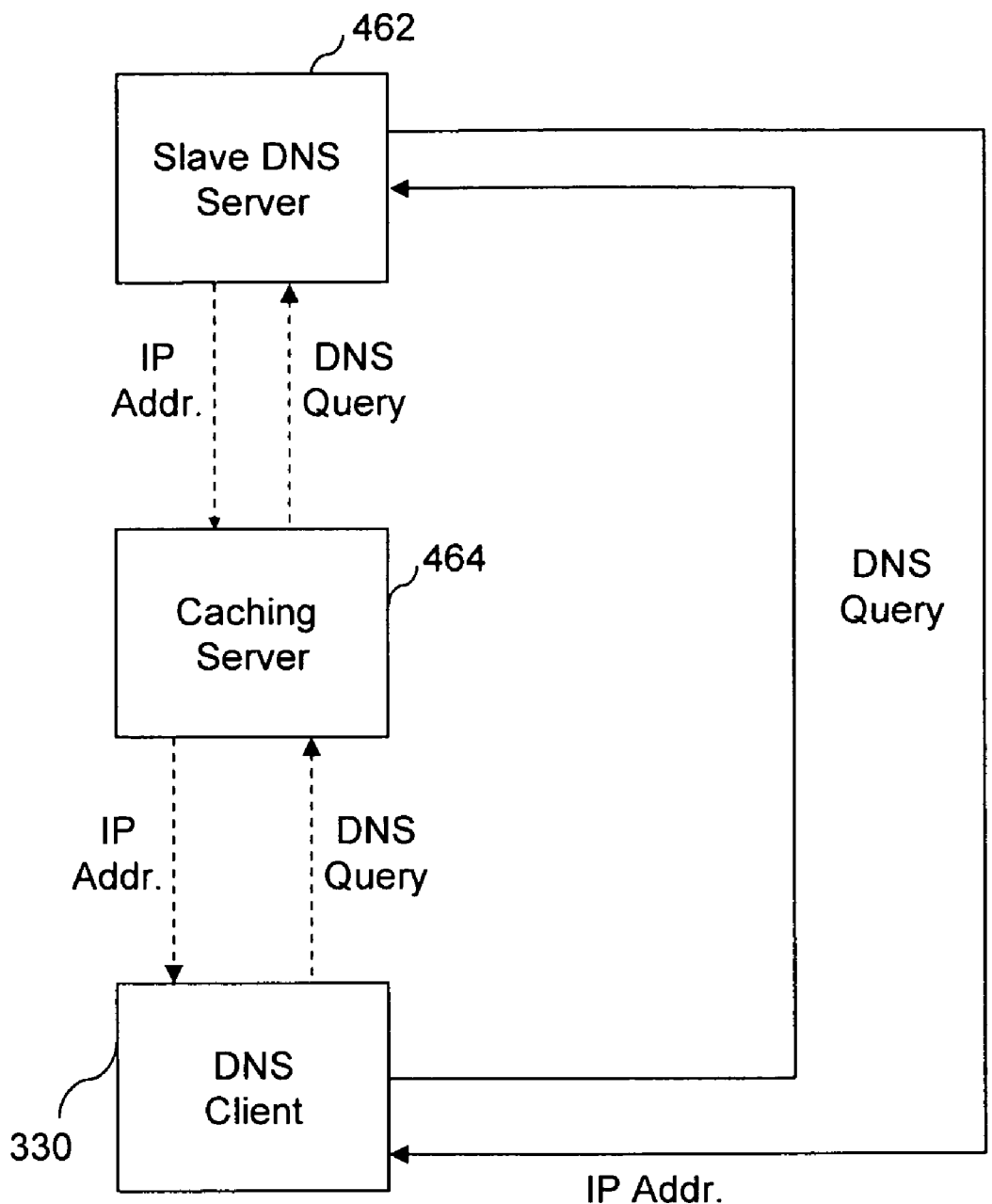
Figure 4:
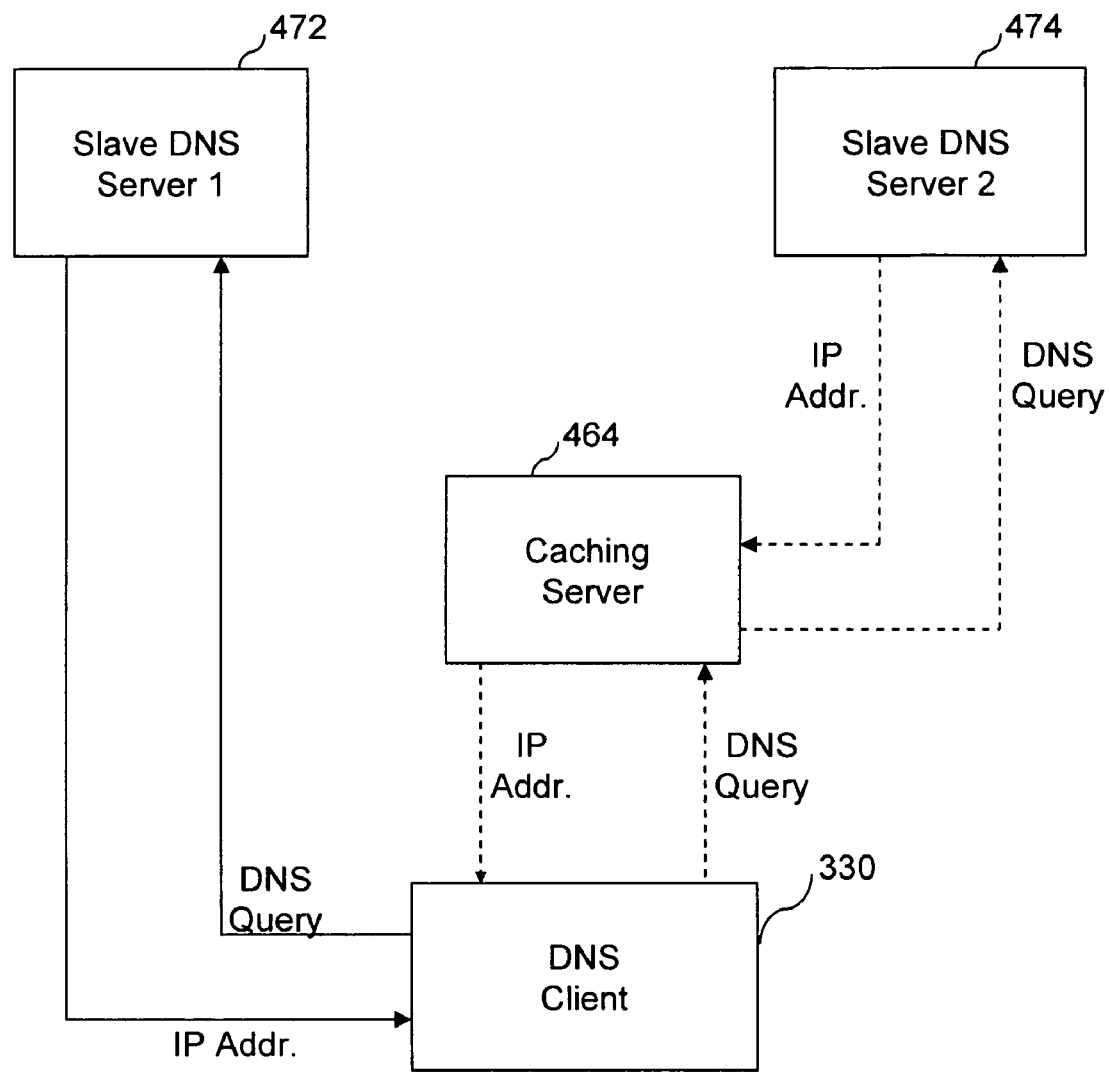

The DNS server hierarchy 320 interacts with the DNS client 330 to receive a DNS query and return an IP address or a list of IP addresses according to the zone data stored in the DNS server hierarchy 320 for the requested domain name. In addition, the DNS server hierarchy 320 operates according to DNS update request received from the dynamic traffic controller 310. Upon receiving such a request, the DNS server hierarchy 320 updates its zone data stored at different levels of the hierarchy. FIGS. 4(*a*)-4(*c*) show various exemplary schemes to update the zone data stored within the DNS server hierarchy 320, according to different embodiments of the present teaching. The DNS server hierarchy 320 may comprise one or more levels of DNS servers, as shown in FIG. 4(*a*), including a primary master DNS server 410 and one or more slave DNS servers, e.g., 430 and 440. Optionally, the DNS server hierarchy may also include one or more master DNS servers, e.g., 420.

In some embodiments, a primary master DNS server may be at the highest level of the DNS server hierarchy, a slave DNS server may be at the lowest level, and a master DNS server may be at an intermediate level. However, their hierarchical relationship may also be different in specific implementations. In a preferred embodiment, the primary master DNS server 410 provides an interface with the dynamic traffic controller 310, through which a DNS update request is received and a DNS update acknowledgement message may be sent to the dynamic traffic controller. The primary master DNS server 410, upon receiving a DNS update request, updates the zone data stored therein and may then proceed to update similar data stored in other DNS servers within the hierarchy.

In FIG. 4(*a*), an exemplary scheme 400 to update similar DNS information stored within the DNS server hierarchy 320 is shown. The primary master DNS server 410, upon receiving a DNS update request from dynamic traffic controller (not shown), sends a DNS notify message to each of the DNS servers to which it is connected. Such a connected DNS server may be a master DNS server, e.g., 420, or a slave DNS server, e.g., 430. Such a notify message may serve the purpose of informing the recipient server that an update to the zone data in the primary master DNS server has been performed. Each of such DNS servers may then send a DNS notify message to other DNS server(s) connected to it, e.g., the master DNS server sends a DNS notify message to slave DNS server 440. A DNS server in receipt of a DNS notify message may further communicate with the DNS server sending the notifying message regarding the change and then operate accordingly.

FIG. 4(*b*) shows an alternative scheme 450 to consistently update DNS information stored in different DNS servers in the DNS server hierarchy 320. In this exemplary scheme, the primary master DNS server 410 may, after receiving a DNS information update request, send a DNS notify message to each master DNS server, e.g., 420, which may subsequently send slave DNS server connected thereto a DNS notify message (e.g., from master DNS server 420 to slave DNS servers 430 and 440).

FIG. 4(*c*) shows yet another exemplary embodiment 455 to propagate a DNS update. The primary master DNS server 410 may send a DNS notify message to a slave DNS server (e.g., 430). This slave DNS server 430 may be designated to serve the function of propagating a DNS update. The slave DNS server 430 may also be a DNS server that has certain specific properties such as being the closest in distance to the primary master DNS server. The slave DNS server that receives a DNS notify message from the primary master DNS server may update its own zone data and then propagate the update by sending a DNS notify message to each master DNS server, which subsequently notifies the connected slave DNS servers.

To perform DNS update in a consistent manner, each DNS server receiving a DNS notify message (the recipient DNS server) may send a response to the DNS server that sends the notify message (the notifying DNS server) to acknowledge the notify message. The notifying DNS server may repeat sending the DNS notify message to a recipient DNS server until it receives an acknowledgement from the recipient DNS server. In some embodiments, a recipient DNS server may also send a Start of Authority (SOA) request to the notifying DNS server to obtain information that can be used to identify the difference between the zone data stored in the notifying DNS server and that stored in the recipient DNS server. For example, such information may be a serial number indicating a version of associated zone data.

When a DNS server hierarchy is present, the DNS client 330 (see FIG. 3) may communicate with the DNS server hierarchy 320 by interfacing with a slave DNS server in the DNS server hierarchy. FIGS. 4(*d*)-4(*e*) show various exemplary schemes of interconnection between a DNS client and a DNS server hierarchy. In FIG. 4(*d*), the DNS client 330 communicates with a slave DNS server, e.g., 462 in the DNS server hierarchy. To receive the IP address(es) corresponding to a domain name, the DNS client 330 sends a DNS query to the slave DNS server 462, which returns the IP address(es) for the requested domain name based on the DNS information (e.g., zone data) stored therein. Alternatively, instead of directly interfacing with a slave DNS server, the DNS client 330 may also communicate with a caching server 464, which caches a portion of the zone data for faster domain name resolution. In this case, in receiving a DNS query from the DNS client 330, the caching server 464 first checks whether the DNS query can be resolved using local cached data. If the DNS query can be resolved based on the cached information, the caching server 464 returns the appropriated IP address(es) identified therein to the DNS client 330. Otherwise, the caching server 464 forwards the DNS query to another DNS server, such as the slave DNS server 462, that has the required information for resolution of the requested domain name. Upon receiving an IP address or a list of IP addresses from the slave DNS server 462 or other DNS server, the caching server 464 returns the IP address(es) to the DNS client 330 and may cache the most recent information in its local database for future DNS queries. The caching server 464 may be located either within or outside of the DNS server hierarchy 320 and it may be integrated with a DNS server.

FIG. 4(*e*) illustrates an alternative scheme, in which the DNS client 330 may either communicate directly with a slave DNS server 472 in the DNS server hierarchy 320 or indirectly with a different slave DNS server 474 via a caching server 464. The caching server 464 may be located either within or outside of the DNS server hierarchy 320.

Figure 5:
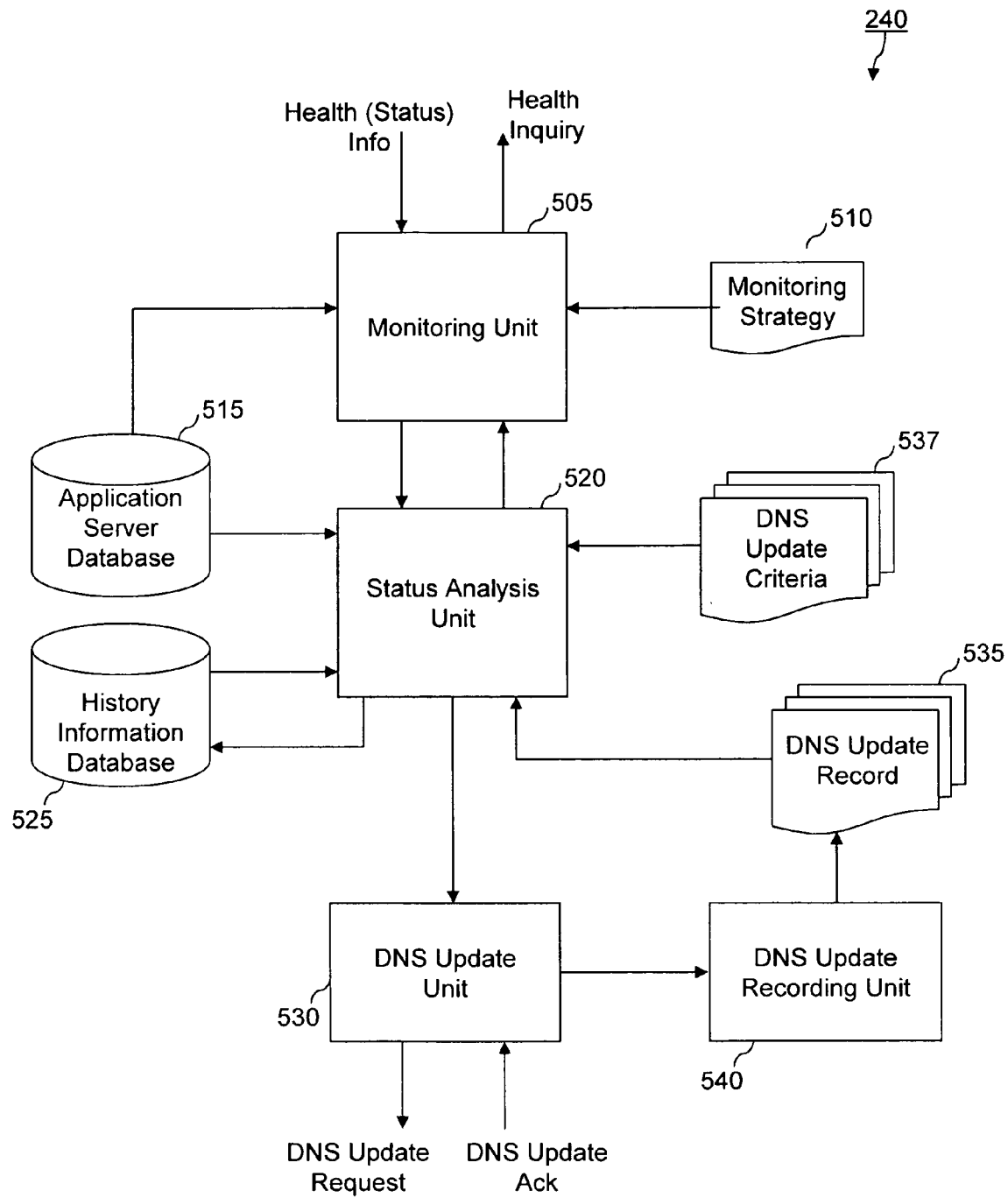
FIG. 5 depicts an exemplary system diagram of a dynamic traffic controller, according to an embodiment of the present teaching.

FIG. 5 depicts an exemplary system diagram of the dynamic traffic controller 240, according to an embodiment of the present teaching. The dynamic traffic controller 240 comprises a monitoring unit 505, a status analysis unit 520, and a DNS update unit 530. The monitoring unit 505 communicates with one or more application servers that are being monitored and gathers operational status information from each application server. The monitoring unit 505 may communicate with these application servers in different protocols or method and collect different types of operational status data based on information associated with different application servers that are stored in an application server database 515. For example, the type of service provided by an application server may affect what status data to be collected from that application server. Such a determination may also be based on certain monitoring strategies 510. For instance, application servers that provide real-time high bandwidth services may need to be monitored more frequently. The monitoring strategy 510 may be pre-determined, configured by the network operator, or it may be dynamically self-adjusted based on real-time network conditions.

Individual units of the dynamic traffic controller 240 may be implemented in hardware, firmware, or as software. The exemplary system diagram as depicted in FIG. 5 may be implemented, partially or fully, in hardware, firmware, as software, or a combination thereof. The hardware implementation of the dynamic traffic controller may be realized using a special purpose computer or device designed to perform the functionality of the dynamic traffic controller. The firmware implementation may be realized using a micro-processor chip with necessary peripherals with the micro-processor specifically programmed to perform the functions of the dynamic traffic controller. Such firmware may be produced using a programmable semiconductor chip such as Field Programmable Gate Arrays (FPGA).

A software solution for the dynamic traffic controller 240 may be designed for suitable platforms of different computing devices. Such computing devices may be for general purposes or for special purposes and include mainframes, server stations, personal computers, or other types of devices.

A software solution for the dynamic traffic controller 240 may be implemented as different varieties, each may be designated for a specific platform. The software solution for the dynamic traffic controller 240 may also be designed as a platform-independent system so that the dynamic traffic controller 240, as a software system, may be deployed on different platforms.

The software solution for the dynamic traffic controller 240 may be stored, as data, on a machine readable medium so that such data, when it is read by a machine, will cause the machine to perform the functionalities of the dynamic traffic controller 240. Such medium includes CD, CD-ROM, flash memory, or SD memory card. The underlying machine that reads the stored software solution of the dynamic traffic controller 240 and executes the corresponding instructions may be integrated with a DNS server, such as the primary master DNS server of a DNS hierarchy, or as a standalone server that is independent of both the DNS server/hierarchy and the application servers.

The dynamic traffic controller 240 may also be implemented as a combination of hardware, firmware, and software solutions. Such a combination may require coherent communications among individual hardware, firmware, and software components designed to perform different functionalities of the dynamic traffic controller 240. Such communications may be conducted in accordance with appropriate industry standards.

The status analysis unit 520 processes the received data from the monitored application server(s) to assess the operational status with respect to each application server. Such an assessment may be made based on both the data of the monitored application server(s) as well as other types of information stored in an application server database 515, such as the service requirement with respect to each application server. The service requirement of each application server stored in the application server database 515 may include service-specific performance metrics for each service provided by the application server. For example, a required response time for an application server providing real-time video streaming services may be less than 5 seconds. If the monitored response time of an application server is 9 seconds for real-time video streaming services, this indicates that the corresponding application server may be experiencing some problem.

The status analysis unit 520 may further determine, based on its assessment of the operational status of an application server, whether it is needed to change the DNS information stored in the DNS server connected therewith. As discussed above, purposes of such a change include either temporarily preventing traffic from being directed to the application server by removing an RR entry corresponding to the application server or resuming the traffic flowing into the application server by adding the RR entry back to the DNS server. To determine whether a change is warranted, the status analysis unit 520 may rely on information from different sources to reach such a determination. In some embodiments, there may be stored DNS update criteria (537) specifying conditions for removal or adding an RR entry.

The DNS update criteria 537 may be application/service dependent and/or application-server dependent. For a particular application/service, each application server may subject to two sets of criteria, one for removal and one for adding RR entry, respectively, from and to the DNS data stored in the DNS server. Such criteria may be pre-determined by the network operator, dynamically adjustable, or re-configurable on-the-fly based on real time situations. Some criteria may specify particular thresholds and some may rely on an estimate of a performance trend derived from collected historical data (e.g., stored in a history information database 525). For instance, a DNS update criterion with respect to an application server, say 250-1 in FIG. 3, may indicate that if the last 5 monitored response times have been continuously increasing and the most recent monitored response time is 10% below the required performance (e.g., 5 seconds), then further traffic should not be directed to the particular application server. To determine whether to suspend traffic from flowing into application server 250-1, the status analysis unit 520 examines the most recent monitored response time (from the monitoring unit 505), the last 5 monitored response times stored in the history database 525, and the specific DNS update criterion stored in 537. If the DNS update criterion is satisfied, the status analysis unit 520 communicates to the DNS update unit 530 instructing it to remove any RR entry corresponding to the application server 250-1 in the DNS server. Otherwise, the status analysis unit 520 may store the most recent monitored response time in the history database 525.

The DNS update criteria 537 may also specify condition(s) under which traffic flow to an application server may be resumed. When traffic flow to an application server is currently suspended (or RR entry for the application server is removed in the DNS server), the status analysis unit 520 makes a determination as to whether to resume the flow based on monitored data, the DNS update criteria 537, and/or the history information 525. Similarly, criteria for resuming traffic flow to an application server may be specified as one or more thresholds, conditions implicating a performance trend, or a combination thereof.

A DNS update decision made by the status analysis unit 520 includes one of the following three decisions. First, it may be a decision of "no update." Second, it may be a decision of "update by removal" (i.e., suspend the traffic flow to an application server). Third, it may be a decision of "update by adding" (i.e., resume traffic flow to an application server). Depending on the current control state associated with an application server (e.g., either traffic flow suspended or traffic flow normal), the status analysis unit 520 may evaluate only some of these decisions. For example, if the current control state with respect to application server, e.g., 520-1, is "flow is suspended", the status analysis unit 520 may evaluate only whether "no update" is needed or to "resume traffic flow through update by adding". That is, a DNS update decision is made in light of the current control state of each application server, which is recorded in DNS update record 535 and accessed by the status analysis unit 520.

When a DNS update decision is received from Status Analysis Unit 520, the DNS update unit 530 issues a DNS update request and sends it to a DNS server or DNS server hierarchy. Such a DNS update request may include various parameters to formulate an instruction to the DNS server. For instance, a DNS update request may include a domain name, an IP address, and/or instructions as to the scope of the update. In some embodiments, the scope of the update may be limited to certain DNS servers in a DNS server hierarchy that are responsible for a certain geographic region. This may be used to reduce the load of the underlying application server instead of completely preventing the traffic from flowing into the application server. After sending a DNS update request, the DNS update unit 530 waits for the acknowledgement message and may repeat sending the DNS update until an acknowledgement is received.

After a DNS update request is issued to a DNS server, the DNS update unit 530 may register the event in the DNS update records 535 by invoking the DNS update recording unit 540 when a DNS update acknowledgement is received from the DNS server (e.g., indicating that the requested update has been made). The DNS update recording unit 540 may then register the update in the DNS update records 535.

In some embodiments, a DNS update request may instruct a DNS server to replace an RR entry associated with an application server with a different RR entry associated with a different application server. This may facilitate re-directing traffic to a different application server that is a secondary or backup of the application server that is experiencing problems. To explicitly re-direct traffic in this manner, the dynamic traffic controller 240 may possess certain knowledge related to a distributed network associated with an application in which each server on a different node of the network constitutes an alternative to provide the same service. Such an alternative server may be selected in different ways. For example, depending on where a DNS query is initiated, the dynamic traffic controller 240 may select an appropriate alternative server that is geographically closest to the replaced server. Alternatively, a server that has the lightest traffic may be chosen for re-directing traffic.

Figure 6:
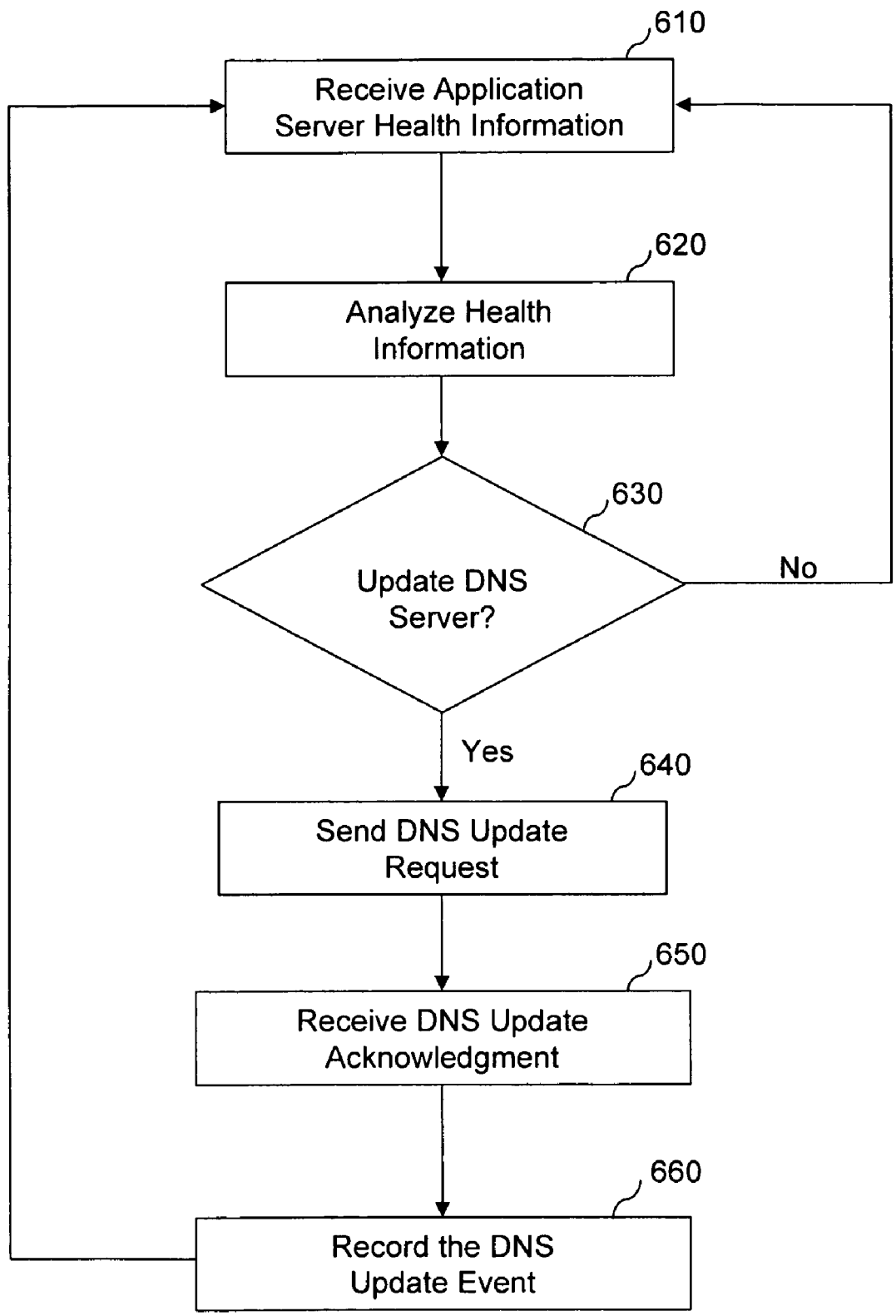
FIG. 6 is a flowchart of an exemplary process in which a dynamic traffic controller interacts with an application server and a DNS server, according to an embodiment of the present teaching.

Below, the processes of different aspects of the present teaching are described. FIG. 6 is a flowchart of an exemplary process in which the dynamic traffic controller 240 interacts with an application server and a DNS server, according to an embodiment of the present teaching. Information related to the operational status of each application server is received at 610. Such information is analyzed at 620, as described herein. Based on the analysis, a decision is made, at 630, as to DNS information update to be performed in a DNS server. When a "no update" decision is made, the dynamic traffic controller 240 returns to monitoring the application server. If it is decided to make a DNS update, the dynamic traffic controller 240 sends a DNS update request to a DNS server at 640. Upon receiving a DNS update acknowledgement at 650, the dynamic traffic controller 240 records, at 660, the update before it returns to monitoring the application server. In some embodiments, monitoring, analyzing, and/or DNS update determination may be performed in parallel, either fully or partially, via multiple processors or multi-tasking. Such multiple processors may reside in a single computing equipment or may be distributed.

Figure 7:
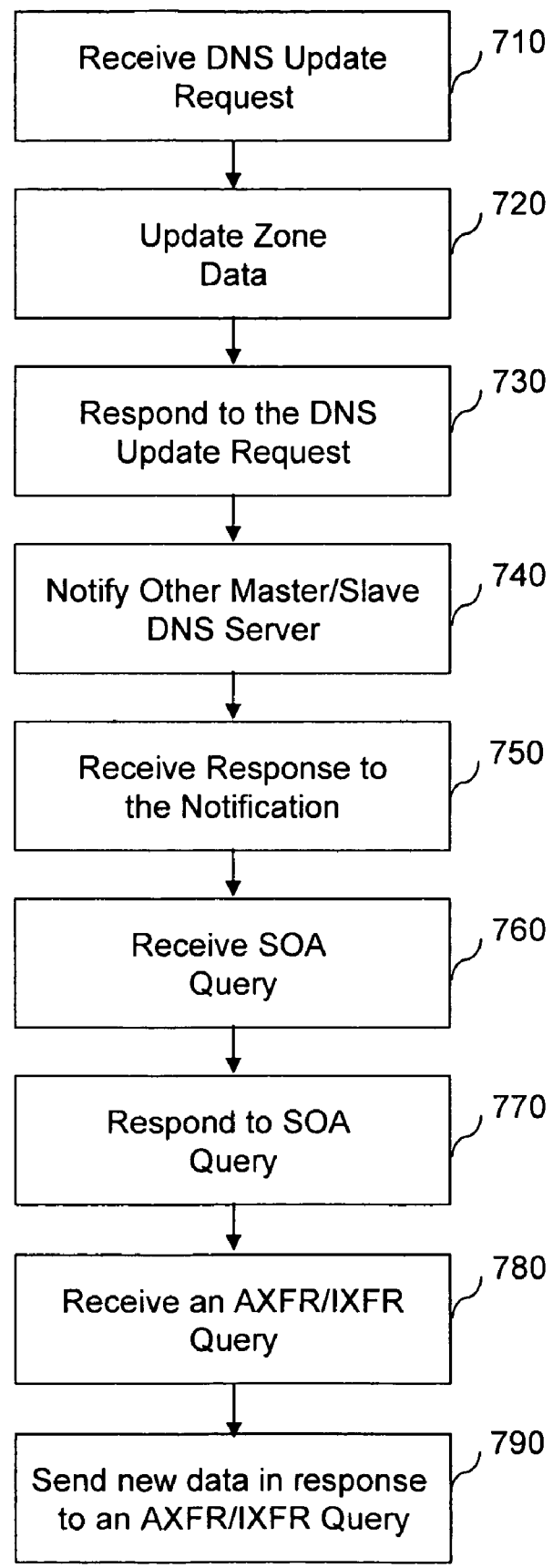
FIG. 7 is a flowchart of an exemplary process in which a primary master DNS server in a DNS server hierarchy dynamically updates zone data based on a DNS update request, according to an embodiment of the present teaching.

FIG. 7 is a flowchart of an exemplary process in which a primary master DNS server in a DNS server hierarchy dynamically updates zone data based on a DNS update request, according to an embodiment of the present teaching. Upon receiving a DNS update request at 710 from the dynamic traffic controller, a primary master DNS server updates, at 720, the DNS information (e.g., zone data) stored therein. A response is then sent, at 730, to the dynamic traffic controller to acknowledge the update request and indicate that the update has been made. To propagate the update within the DNS server hierarchy, the primary master DNS server sends, at 740, a DNS notify message to a master DNS server or a slave DNS server to inform the recipient that an update has been made to the DNS information stored therein. A response to the notify message may be received, at 750, from a recipient. The notify message may be sent repeatedly until a response message is received.

To ensure consistent DNS update propagation, a recipient of a notify message may send an SOA query to the primary master DNS. When such an SOA request is received at 760, the primary master DNS server responds, at 770, to the SOA query by sending the requested information (e.g., serial number associated with the updated DNS information). When the primary master DNS server receives, at 780, a request for the updated DNS information, either an AXFR query for a complete copy of all zone data or an IXFR query for the incremental version of the zone data; the requested data is sent, at 790, to the requesting DNS server.

Figure 8:
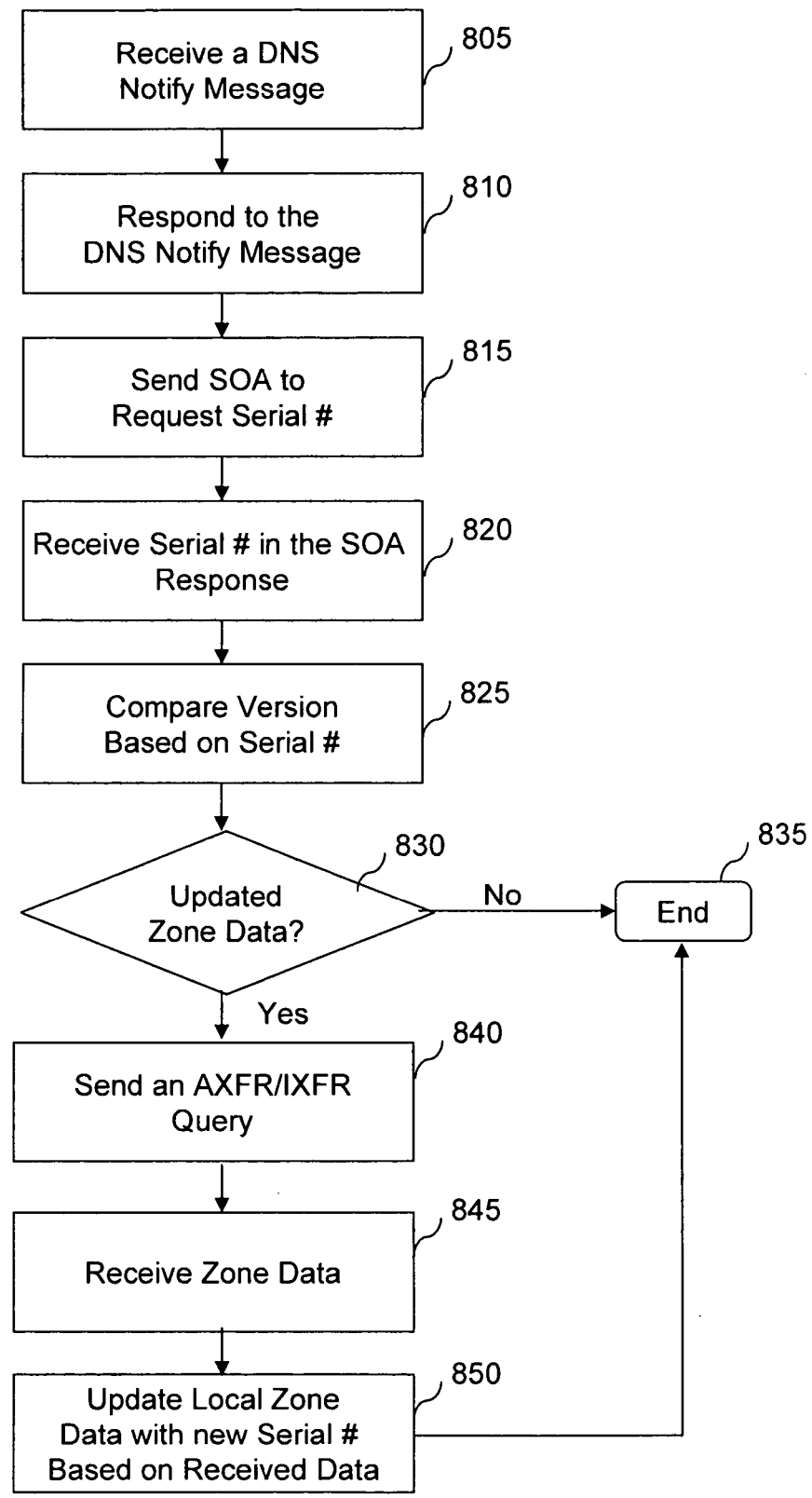
FIG. 8 is a flowchart of an exemplary process in which a recipient DNS server dynamically updates zone data consistent with the updated zone data stored in a notifying DNS server, according to an embodiment of the present teaching.

FIG. 8 is a flowchart of an exemplary process in which a recipient DNS server, upon receiving a DNS notify message from a notifying DNS server dynamically updates zone data therein to match the zone data stored in the notifying DNS server, according to an embodiment of the present teaching. Upon receiving a DNS notify message at 805, the recipient DNS server responds, at 810, to the update notify message. An SOA query is then sent, at 815, by the recipient DNS server to the notifying DNS server to request the serial number associated with the updated DNS information. When the recipient DNS server receives, at 820, a response to the SOA query and the requested serial number, the recipient DNS server compares, at 825, the received serial number with that of the DNS information stored therein. If the comparison indicates that the DNS information stored in the recipient DNS server is older than the updated DNS information stored in the notifying DNS server, determined at 830, the recipient DNS server proceeds to accordingly update its DNS information by sending, at 840, a request for the updated information from the notifying DNS server. The request may be either for an AXFR query or IXFR query. When the recipient DNS server receives the requested zone data, at 845, the corresponding zone data in the recipient DNS server is updated, at 850, based on the received data. In addition, the new serial number associated with the zone data will also be stored in the recipient DNS server. As a result, when another DNS Notify is received for the same change, the recipient DNS server may not send an AXFR or IXFR query again when the serial number returned from the notifying DNS server matches the serial number in the recipient DNS server.

While the present teachings have been described with reference to the certain illustrated embodiments, the words that have been used herein are words of description, rather than words of limitation. Changes may be made, within the purview of the appended claims, without departing from the scope and spirit thereof. Although the subject matter has been described herein with reference to particular structures, acts, and materials, the teachings herein are not to be limited to the particulars disclosed, but rather extend to all equivalent structures, acts, and, materials, such as are within the scope of the appended claims.

What is claimed is:

1. A system comprising:
    an application server providing an application service associated with a domain name corresponding to at least one Internet Protocol (IP) address of the application server;
    a domain name system (DNS) server hierarchy configured for providing, based on the DNS information for the application service stored therein, one of the at least one IP address as a response to a DNS query associated with the domain name; and
    a dynamic traffic controller, residing outside of the DNS server hierarchy, wherein the dynamic traffic controller comprises:
    a server status inquiry unit configured for requesting and receiving measurements of performance of the application server comprising measurements of: CPU (Central Processor Unit) utilization for the application server, throughput for the application server, subsystem response time, and system load level on the application server;
    a server status analysis unit configured for analyzing the received measurements to assess operational status of the application server, to automatically determine, based on the analysis result, whether to update DNS information stored in the DNS server hierarchy to implement a change needed in the DNS information for the application service;

a DNS update unit, responsive to determining that change is needed in the DNS information for the application service based on the health condition of the application server, the DNS update unit being configured for automatically sending a request for the DNS server hierarchy to remove an existing resource record (RR) entry or add a new RR entry associated with the application server from or to the DNS information stored in the DNS server hierarchy to generate updated DNS information so that the DNS server hierarchy, upon receiving a DNS query initiated by a user, resolves the DNS query based on the updated DNS information and directs traffic only to an IP addresses that has an RR entry in the updated DNS information and returns the IP address to the user as a response to the DNS query, wherein:

the DNS server hierarchy includes a plurality of master DNS servers and at least one slave DNS server, and one of the master DNS servers is designated to be a primary master DNS server responsible for communicating with the dynamic traffic controller regarding the DNS change and with another master DNS server and/or a slave DNS server for propagating the DNS change; and a recording unit configured for recording each change made to the DNS information, wherein:

the primary master DNS server is configured to remove the existing RR entry from or add the new RR entry to the DNS information for the domain name in the DNS server hierarchy in response to the request, and to send an acknowledgement as a response to the request, and the dynamic traffic controller is configured to record the removal of the existing RR entry or the addition of the new RR entry in the recording unit, in response to receiving the acknowledgement.

2. The system according to claim 1, wherein the primary master DNS server is further configured to:
send a notifying message to at least one of a master DNS server and/or a slave DNS server regarding the request; and
receive a response to the notifying message.

3. The method system according to claim 2, wherein the primary master DNS server is further configured to:
receive a start of authority (SOA) query from at least one of a master DNS server and/or a slave DNS server;
send a response to the SOA query to the at least one of a master DNS server and a slave DNS server.

4. The system according to claim 3, wherein the primary master DNS server is further configured to:
receive at least one of an AXFR request and an IXFR request for DNS information; and
send the DNS information as a response to the AXFR request and/or the IXFR request.

5. The system according to claim 1, wherein the server status analysis unit is further configured for:
also assessing whether the application server is up or down, and automatically determining the change is needed in the DNS information for the application service based on the determination of whether the application server is up or down and based on the operational status assessed based on the measurement of the value of performance of the application server related to health of the application server and the measurement of the level of load on the application server.

6. The system according to claim 1, wherein the application server is configured to take the measurements and to send the measurements to the dynamic traffic controller in response to a request from the server status inquiry unit.

\* \* \* \* \*